(12) United States Patent
Nguyen

(10) Patent No.: US 11,820,052 B2
(45) Date of Patent: *Nov. 21, 2023

(54) MECHANICAL INTERLOCK PIN ASSEMBLY

(71) Applicant: NYPROMOLD INC., Clinton, MA (US)

(72) Inventor: Tuan H. Nguyen, Clinton, MA (US)

(73) Assignee: NyproMold Inc., Clinton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/844,531

(22) Filed: Jun. 20, 2022

(65) Prior Publication Data

US 2022/0314500 A1   Oct. 6, 2022

Related U.S. Application Data

(63) Continuation of application No. 16/206,214, filed on Nov. 30, 2018, now Pat. No. 11,376,767.

(60) Provisional application No. 62/592,953, filed on Nov. 30, 2017.

(51) Int. Cl.
  *B29C 45/44*   (2006.01)
  *B29C 37/00*   (2006.01)
  *B29C 45/16*   (2006.01)
  *B29C 45/26*   (2006.01)

(52) U.S. Cl.
  CPC ...... *B29C 37/0082* (2013.01); *B29C 45/1615* (2013.01); *B29C 45/1635* (2013.01); *B29C 45/1657* (2013.01); *B29C 45/1671* (2013.01); *B29C 45/262* (2013.01); *B29C 45/2681* (2013.01); *B29C 45/44* (2013.01); *B29C 2045/1601* (2013.01); *B29C 2045/1668* (2013.01); *B29C 2045/1673* (2013.01)

(58) Field of Classification Search
  CPC .................... B29C 45/262; B29C 37/0082
  See application file for complete search history.

(56) References Cited

U.S. PATENT DOCUMENTS

| | | | | |
|---|---|---|---|---|
| 6,426,030 | B1* | 7/2002 | Julian | B29C 43/42 264/318 |
| 11,376,767 | B2* | 7/2022 | Nguyen | B29C 37/0082 |
| 2003/0075831 | A1* | 4/2003 | Venus | B29C 45/2681 264/318 |
| 2011/0278759 | A1* | 11/2011 | Sohn | B29C 45/1676 264/250 |
| 2017/0069956 | A1* | 3/2017 | Hill | G06F 1/1656 |

* cited by examiner

*Primary Examiner* — William P Watkins, III
(74) *Attorney, Agent, or Firm* — Duquette Law Group

(57) ABSTRACT

A mechanical interlock pin assembly includes a shaft having a first end and a second end. The mechanical interlock pin assembly includes a set of helical spline elements disposed at the first end of the shaft, the set of helical spline elements extending along a longitudinal axis of the shaft. The mechanical interlock pin assembly includes a bearing rotatably coupled to the second end of the shaft, the bearing configured to allow rotation of the shaft between a first rotational position and a second rotational position relative to a mold cavity.

10 Claims, 8 Drawing Sheets

MECHANICAL INTERLOCK PIN ASSEMBLY

RELATED APPLICATIONS

This patent application is a continuation of U.S. Utility application Ser. No. 16/206,214, filed on Nov. 30, 2018, entitled "Mechanical Interlock Pin Assembly," which claims the benefit of U.S. Provisional Application No. 62/592,953, filed on Nov. 30, 2017, entitled "Mechanical Interlock Pin Assembly," the contents and teachings of which are hereby incorporated by reference in their entirety

BACKGROUND

Field of the Invention

Embodiments of the innovation relate to a mechanical interlock pin assembly configured to create a mechanical interlock between two elements molded during a two-shot molding process.

Description

Conventional two-shot molding processes chemically bond two materials to one another to create a single part. For example, during a two-shot manufacturing process, an injection molded part can be formed by injecting a first material into a mold cavity of a two-shot molding assembly to form a first portion of the injection molded part. The mold cavity can include a set of pins which define an interface between the first and second materials. As the first material is injected into a first shot cavity, the material can flow around the pins, resulting in the formation of a set of corresponding cavities in the first portion of the injection molded part.

After molding the first shot portion, a second shot material is then injected into a second shot cavity. The second shot material contacts the surface of the first portion and flows into the cavities previously defined by the pins. Cooling and solidification of the second shot material forms a second shot portion of the molded part.

SUMMARY

Conventional two-shot molding assemblies suffer from a variety of deficiencies. For example, during a conventional two-shot molding process, a second material introduced into a mold may not physically bond to a first molded material, even with the presence of an interface between the first and second materials. As a result, the two-shot molded part formed in the molding process can experience a mechanical failure between the first portion and the second, over-molded portion.

By contrast to conventional two-shot molding assemblies, embodiments of the innovation relate to a mechanical interlock pin assembly configured to form a mechanical interlock path within a first material during a two-shot molding process. The mechanical interlock pin assembly includes a shaft having a first end and a second end. The first end of the shaft includes a set of splines that extend along a longitudinal axis of the shaft and the second end of the shaft is rotatably coupled to a bearing. In one arrangement, the number of splines and leading angle of splines relative to the longitudinal axis of the shaft are calculated based upon the diameter of the interlocking features.

During operation, the first end of the shaft is disposed into a mold cavity. As a first shot of material enters the mold, the material flows around the splines of the mechanical interlock pin assembly. Once the first shot material has set and cooled enough for ejection, the shaft is pulled along a direction relative to the direction of the mold opening from the first shot material. As the shaft travels away from the first shot material, the shaft rotates about its longitudinal axis, relative to the bearing. This rotation causes the splines to form undercuts of a mechanical interlock path within the first shot material. The manufacturer then introduces a second shot of material into the mold over the first shot material. The second shot material flows into the splined mechanical interlock path defined by the first shot material, as created by the mechanical interlock pin assembly. As the second shot material cools and hardens, the second shot material mechanically interlocks with the first shot material. Such interlocking limits the ability for the second shot material to loosen or become separated from the first shot material, such as caused by little or no chemical bonding occurring between the first and second shot materials during the molding process.

In one arrangement, embodiments of the innovation relate to a mechanical interlock pin assembly which includes a shaft having a first end and a second end. The mechanical interlock pin assembly includes a set of helical spline elements disposed at the first end of the shaft, the set of helical spline elements extending along a longitudinal axis of the shaft. The mechanical interlock pin assembly includes a bearing, such as a bearing assembly or low friction washer (e.g., a hardened washer), rotatably coupled to the second end of the shaft, the bearing configured to allow rotation of the shaft between a first rotational position and a second rotational position relative to a mold cavity.

In one arrangement, embodiments of the innovation relate to an injection molding system. The injection molding system includes a first mold plate defining a mold cavity, a second mold plate opposing the first mold plate, and a mechanical interlock pin assembly coupled to the second mold plate. The mechanical interlock pin assembly includes a shaft having a first end and a second end, a set of helical spline elements disposed at the first end of the shaft, the set of helical spline elements extending along a longitudinal axis of the shaft, and a bearing rotatably coupled to the second end of the shaft. The bearing is configured to allow rotation of the shaft between a first rotational position and a second rotational position relative to a mold cavity.

In one arrangement, embodiments of the innovation relate to, in an injection molding system, a method for forming a two-shot molded element. The method includes disposing, by the injection molding system, a distal portion of a shaft of a mechanical interlock pin assembly within a mold cavity, the distal portion of the shaft having a set of helical spline elements extending along a longitudinal axis of the shaft. The method includes injecting, by the injection molding system, a first material into the mold cavity. The method includes withdrawing, by the injection molding system, the shaft of the mechanical interlock pin assembly from the first shot material to define a splined mechanical interlock path therein. The method includes injecting, by the injection molding system, a second shot material into the mold cavity.

BRIEF DESCRIPTION OF THE DRAWINGS

The foregoing and other objects, features and advantages will be apparent from the following description of particular embodiments of the innovation, as illustrated in the accompanying drawings in which like reference characters refer to the same parts throughout the different views. The drawings are not necessarily to scale, emphasis instead being placed upon illustrating the principles of various embodiments of the innovation.

DETAILED DESCRIPTION

Embodiments of the innovation relate to a mechanical interlock pin assembly configured to form a mechanical interlock path within a first material during a two-shot molding process. The mechanical interlock pin assembly includes a shaft having a first end and a second end. The first end of the shaft includes a set of splines that extend along a longitudinal axis of the shaft and the second end of the shaft is rotatably coupled to a bearing.

During operation, the first end of the shaft is disposed into a mold cavity. As a first shot of material enters the mold, the material flows around the splines of the mechanical interlock pin assembly. Once the first material has set and cooled enough for ejection, the shaft is pulled along a direction relative to the direction of the mold opening from the first shot material. As the shaft travels away from the first shot material, the shaft rotates about its longitudinal axis, relative to the bearing. This rotation causes the splines to create undercuts of a mechanical interlock path within the first shot material. The manufacturer then introduces a second shot of material into the mold over the first shot material. The second shot material flows into the splined mechanical interlock path defined by the first shot material, as created by the mechanical interlock pin assembly. As the second shot material cools and hardens, the second shot material mechanically interlocks with the first shot material. Such interlocking limits the ability for the second shot material to loosen or become separated from the first shot material.

Figure 1:
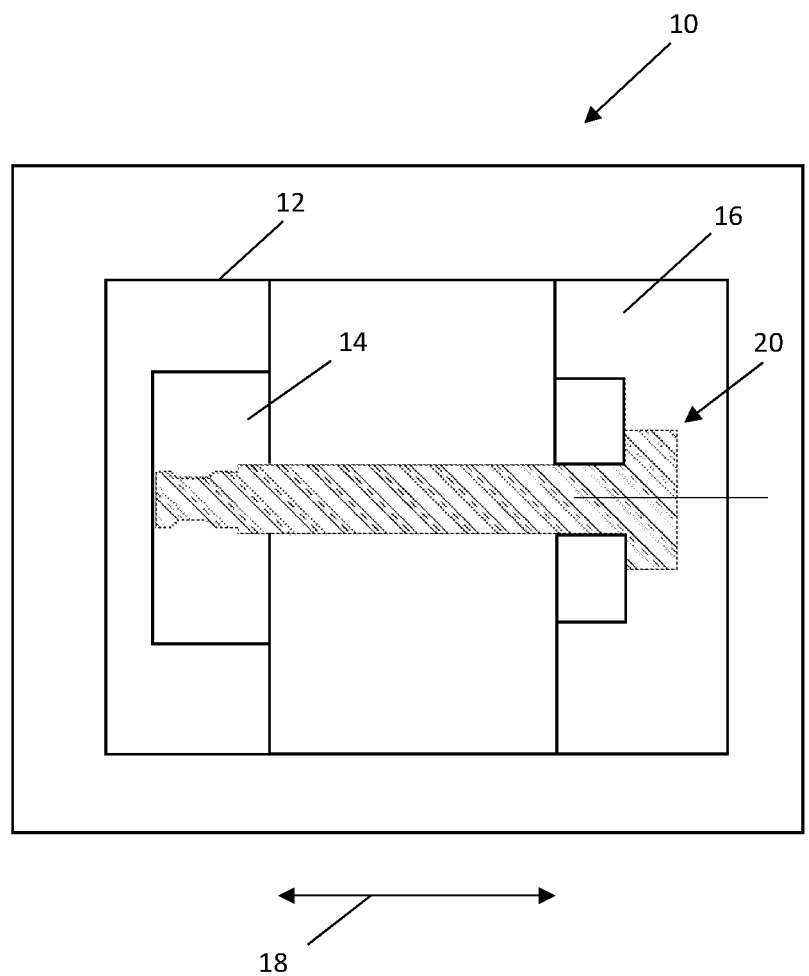
FIG. 1 illustrates a schematic diagram of a two-shot injection molding system having a mechanical interlock pin assembly, according to one arrangement.

FIG. 1 illustrates a schematic representation of an injection molding system 10, according to one arrangement. The injection molding system 10 includes a first mold plate 12 defining a mold cavity 14 and a second mold plate 16 opposing the first mold plate 12. The injection molding system 10 is configured to adjust the relative lateral positioning of the first and second mold plates 12, 14. For example, during operation, the injection molding system 10 positions the first and second mold plates 12, 14 along axis 18 to a closed position, as shown, to allow the injection of a material into the mold cavity 14 to create a molded element. Following the molding procedure, the injection molding system 10 positions the first and second mold plates 12, 14 along axis 18 to an opened position, such as to allow ejection of the molded element.

In one arrangement, the injection molding system 10 is configured as a two-shot molding system. The two-shot molding process creates a single molded element formed with two materials that are chemically bonded to one another. To minimize the possibility for separation of the two materials, such as caused by a weakness in the chemical bond, the injection molding system 10 is configured to form a mechanical coupling between the two materials used in the two-shot molding or over-molding process. For example, the injection molding system 10 can include a mechanical interlock pin assembly 20 coupled to the second mold plate 16. During operation, as will be described below, the mechanical interlock pin assembly 20 is configured to generate a mechanical interlock path between first and second shot materials to limit or prevent separation of the materials following the two-shot molding process.

Figure 2:
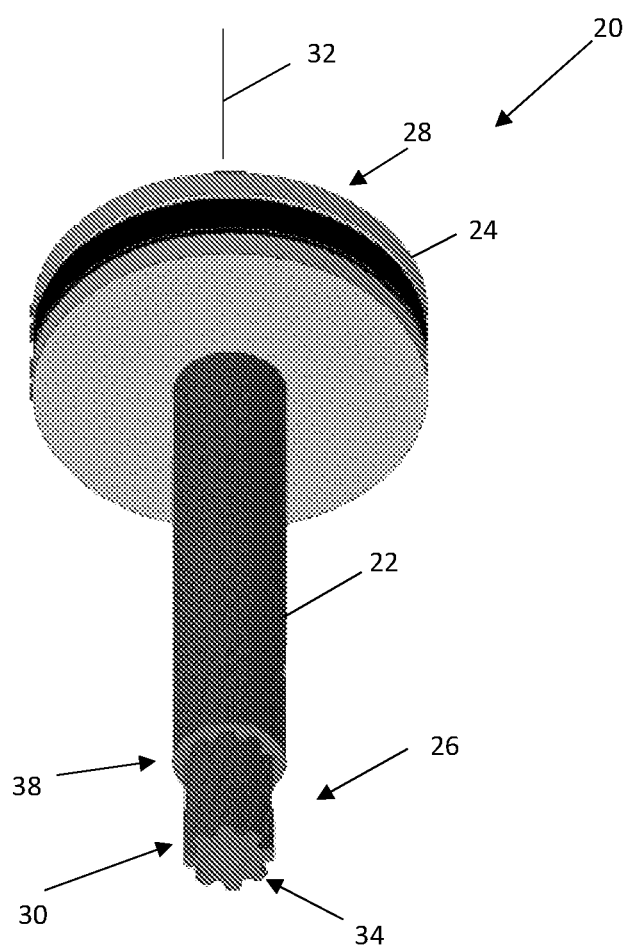
FIG. 2 illustrates a bottom perspective view of the mechanical interlock pin assembly of FIG. 1, according to one arrangement.

FIG. 2 illustrates a mechanical interlock pin assembly 20, such as provided in FIG. 1, according to one arrangement. As illustrated, the mechanical interlock pin assembly 20 includes a shaft 22 having a first or distal portion or end 26 and a second or proximal portion or end 28 and a bearing, such as a bearing assembly 24, rotatably coupled to the shaft 22. While the shaft 22 can be manufactured from a variety of materials, in one arrangement, the shaft 22 is manufactured from a steel material which can withstand multiple two-shot molding processes.

As shown, the first end 26 of the shaft 22 includes a set of helical spline elements 30 that extend along a longitudinal axis 32 and that are configured to create undercuts or a channel geometry of a mechanical interlock path in a first shot material during a two-shot molding process. For example, with additional reference to FIG. 3, each spline element 34 of the set of helical spline elements 30 is configured as a protrusion that extends in a radial direction from the longitudinal axis 32 of the shaft 22. While each spline element 34 of the set of helical spline elements 30 can define a variety of cross-sectional geometries, in one arrangement, each spline element 34 can define a substantially rectangular cross-section, as illustrated. Further, the set of helical spline elements 30 can be configured with between four and thirty individual helical spline elements 34 disposed about the outer periphery of the first end 26 of the shaft 22. For example, in the case where the set of helical spline elements 30 includes eight helical spline elements 34, each spline element 34 is disposed about the periphery at a radial position that is 45° from an adjacent spline element 34. In another example, in the case where the set of helical spline elements 30 includes six individual helical spline elements 34, each spline element 34 is disposed about the periphery at a radial position that is 60° from an adjacent spline element 34. Such a geometry of the set of helical spline elements 30 creates a relatively large surface area in a first shot material with which the second shot material can mechanically interact.

The number of individual helical spline elements 34 disposed about the outer periphery of the first end 26 of the shaft 22 can be determined by the calculation of an interlocking diameter of the mechanical interlock path. Further, depending on the final determination of the number of individual helical spline elements 34 and the leading spline angle or pitch relative to the longitudinal axis 32, the shaft 22 can be configured to rotate on the first shot cavity hardened surface.

Figure 3:
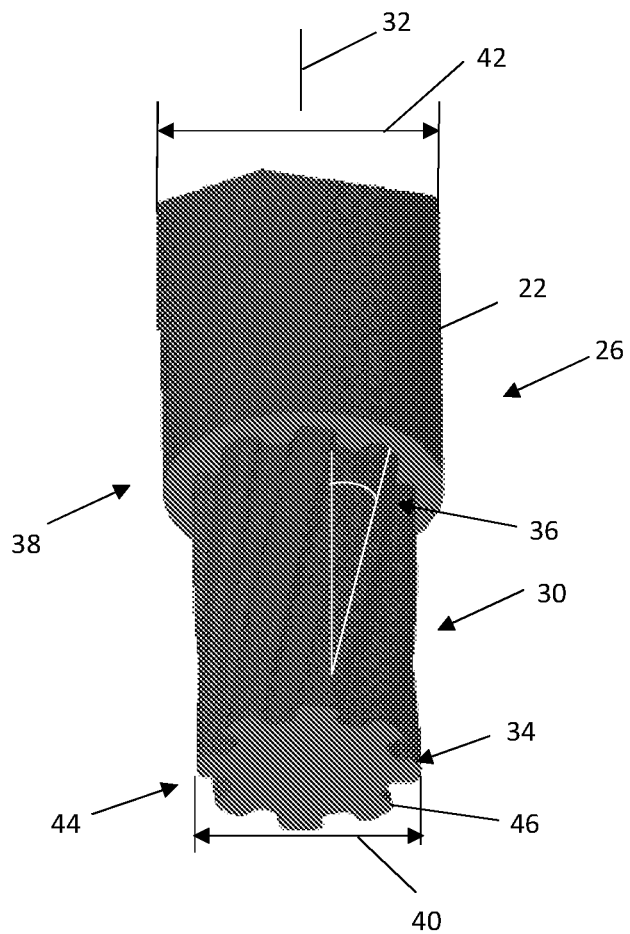
FIG. 3 illustrates a bottom perspective view of a distal end of the mechanical interlock pin assembly of FIG. 2, according to one arrangement.

With continued reference to FIG. 3, the set of helical spline elements 30 can be disposed at the first end 26 of the shaft 22 in a variety of ways. For example, each spline element 34 of the set of helical spline elements 30 is disposed at a pitch 36 of between about 2° and 30° relative to the longitudinal axis 32 of the shaft 32. In use, such a pitch range allows the shaft 22 to rotate a relatively minimal amount in order to extract the set of helical spline elements 30 from a first shot material following a molding procedure.

In one arrangement, the shaft 22 is configured to set a depth of the mechanical interlock path within the first shot material. For example, the shaft 22 can include a shoulder portion 38 disposed at the first end 26. As indicated, the set of helical spline elements 30 extend from the shoulder portion 38 of the shaft 22 where an outer diameter 40 of the set of helical spline elements 30 is less than an outer diameter 42 of the shoulder portion 38. With such a configuration, when the injection molding system 10 disposes the mechanical interlock pin assembly 20 within a mold cavity 14 and injects a first shot material therein, the distance between the shoulder portion 38 and a distal end 44 of the set of helical spline elements 30 defines the depth of the mechanical interlock path in the molded material. In one arrangement, the set of helical spline elements 30 can have the same diameter as the shaft 22 when the set of helical spline elements 30 meets a minimum shaft strength requirement.

In one arrangement, the shaft 22 is configured to form the mechanical interlock path within the first shot molded element as a through hole. For example, the set of helical spline elements 30 can define a shaft face 46 at the distal end 44 where the orientation of the shaft face 46 is substantially parallel to a mold surface of a mold cavity 14. In another example, the set of helical spline elements 30 can define the shaft face 46 as being substantially flat and normal to the longitudinal axis of the shaft 22 (i.e., as long as the face 46 clears the mating surface of the mold surface of the mold cavity 14 as the shaft rotates out from a first shot material) With such a configuration, during operation, when the injection molding system 10 disposes the mechanical interlock pin assembly 20 within the mold cavity 14, the shaft face 42 can contact the mold surface of the cavity 14. With such contact, when the injection molding system 10 injects a first shot material within the mold cavity, the contact between the shaft face 42 and the mold cavity 14 limits or prevents the liquid injection material from flowing into the space there between. Further, when the injection molding system 10 withdraws the mechanical interlock pin assembly 20 from the first shot material, the resulting mechanical interlock path extends through the first shot material. Accordingly, the configuration of the set of helical spline elements 30 can minimize or prevent the formation of a blind pocket within the first shot material and allowing for adequate ventilation through the mechanical interlock path.

Figure 4:
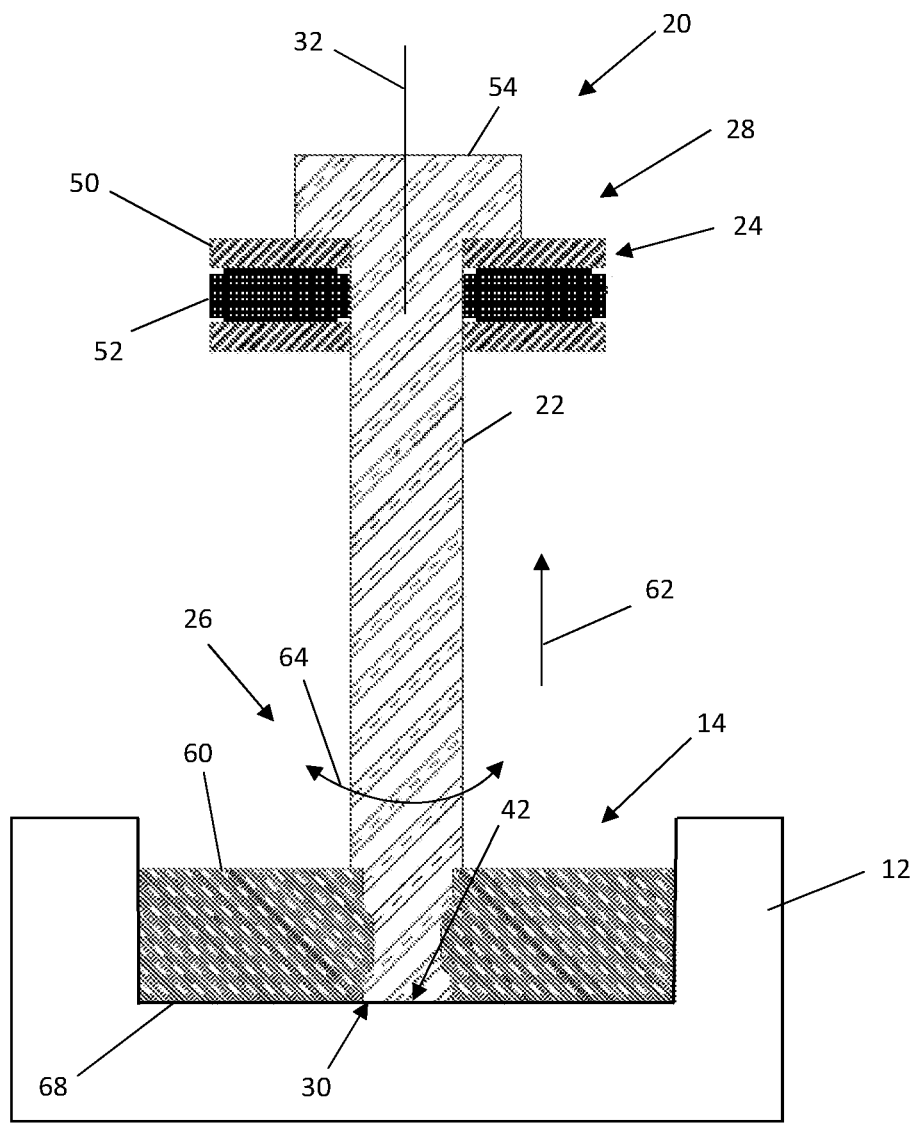
FIG. 4 illustrates a side sectional view of the mechanical interlock pin assembly of FIG. 2 disposed in a first rotational position relative to a mold cavity, according to one arrangement.

With reference to FIG. 4, and as indicated above, the mechanical interlock pin assembly 20 includes a bearing such as a bearing assembly 24 rotatably coupled to the second end 28 of the shaft 22. The bearing assembly 24 is configured to allow rotation of the shaft 22 between a first rotational position and a second rotational position relative to a mold cavity 14. For example, the bearing assembly 24 can include a housing 50 and a bearing element 52 carried by the housing 50. The housing 50 can be connected to the second mold plate 16, as indicated in FIG. 1, and can support a portion of the shaft 22. For example, in the case where the shaft 22 defines a shaft head 54 disposed at the second end 26 of the shaft 22, the housing 50 can provide a lateral support surface for the shaft head 54.

The bearing element 52 is configured to allow rotation of the shaft 22 between the first and second rotational positions relative to the housing 50. For example, following the molding of a first shot material 60 within the mold cavity 14 of the first mold plate 12, the injection molding system 10 can withdraw the mechanical interlock pin assembly 20 from the first shot material 60 by translating the second mold plate 16 and the housing 50 along a vertical direction 62 away from the first mold plate 12. As the injection molding system 10 translates the housing 50, the shaft 22 of the mechanical interlock pin assembly 20 rotates about the longitudinal axis 32 of the shaft 22 relative to the housing 50 and the bearing element 52, such as along counterclockwise direction 64. Such rotation of the shaft 22 causes the set of helical spline elements 30 to rotate relative to the first shot material 60 to create undercuts or a channel geometry of a mechanical interlock path in the material 60.

While the bearing is shown and described as a bearing assembly 24, the bearing can be configured in a variety of ways. For example, the bearing can be configured as a relatively low friction washer, such as a hardened washer, coupled to the second end of the shaft.

In one arrangement, the shaft 22 can rotate through an angle that corresponds to the pitch of the helical spline elements 30. For example, as provided above, the set of helical spline elements 30 is disposed at a pitch 36 of between about 2° and 30° relative to the longitudinal axis 32 of the shaft 32. In such a case, as the injection molding system 10 translates the housing 50, the shaft 22 rotates through an angle of between about 2° and 30° about the longitudinal axis 32 to create the channel geometry or undercuts of the mechanical interlock path of the first shot material 60.

As provided above, the injection molding system 10 is configured to utilize the mechanical interlock pin assembly 20 to form a mechanical interlock path within a first material during a two-shot molding process. A method for molding of a two-shot molded element is described below with reference to FIGS. 4-8.

During operation, and with reference to FIG. 4, the injection molding system 10 is configured to dispose a distal portion 26 of a shaft 22 of the mechanical interlock pin assembly 20 within a mold cavity 14 of a first mold plate 12. For example, in the case where the mechanical interlock pin assembly 20 is carried by a second mold plate (not shown), the injection molding system 10 can position a second mold plate 16 relative to the first mold plate 12 to insert the pin assembly 20 into the mold cavity 14. In one arrangement, to minimize or prevent the formation of a blind pocket within a first shot material molded by the first mold plate 12, the injection molding system 10 can dispose the mechanical interlock pin assembly 20 within the mold cavity 14 such that the shaft face 42 of the set of helical spline elements 30 contacts the mold face 68 of the mold cavity 14.

Next, the injection molding system 10 is configured to inject a first shot material 60, such as a molten polymer material, into the mold cavity 14. When the injection molding system 10 injects the first shot material 60 into the mold cavity 14, it flows around the set of helical spline elements 30 and conforms to the shape of each spline element 34. In the case where the shaft face 42 contacts the mold face 68 of the mold cavity 14, such contact can limit or prevent the first shot material 60 from flowing into this area.

Figure 5:
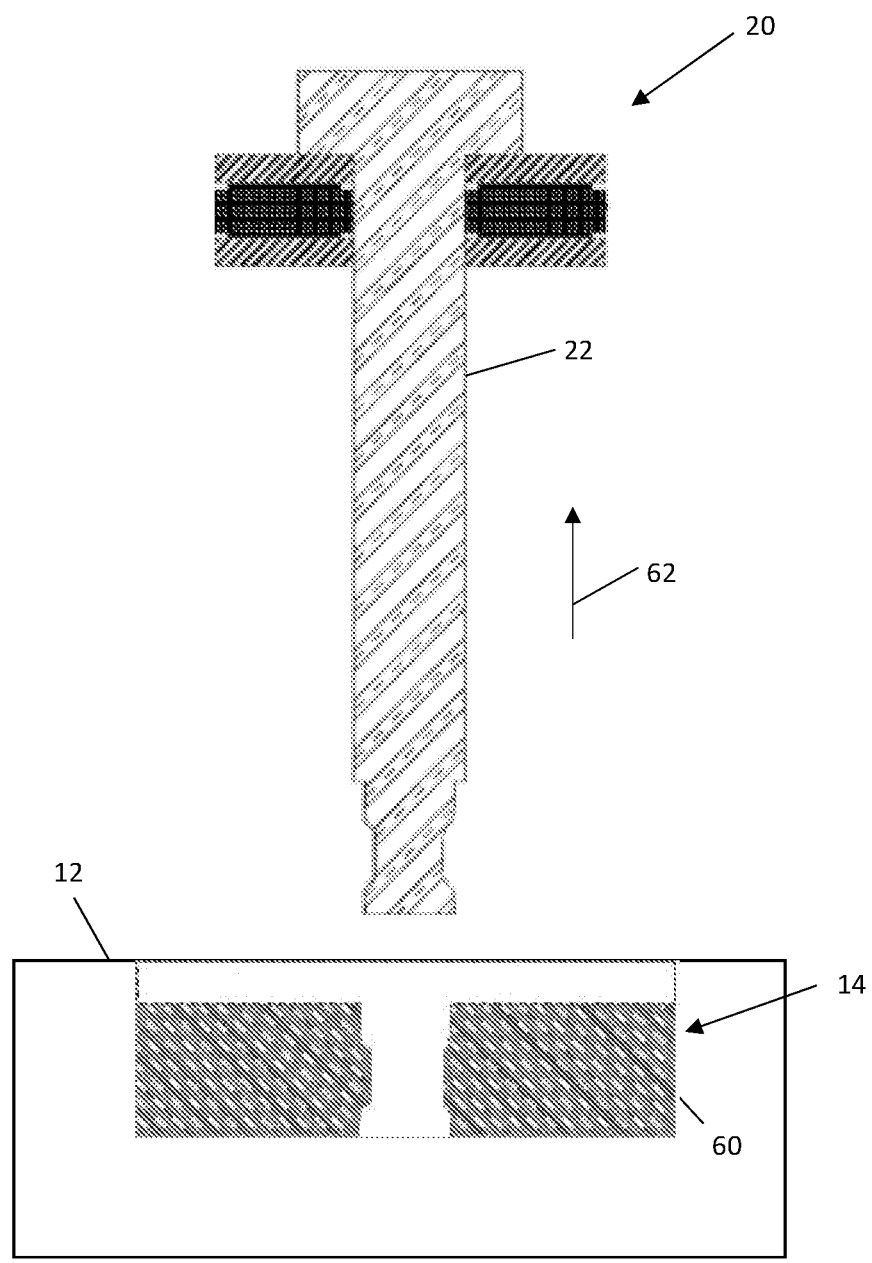
FIG. 5 illustrates a side sectional view of the mechanical interlock pin assembly of FIG. 4 disposed in a second rotational position relative to the mold cavity, according to one arrangement.

Next, following setting and at least partial cooling of the first shot material 60, the injection molding system 10 is configured to withdraw the shaft 22 of the mechanical interlock pin assembly 20 from the first shot material 60 to define a splined mechanical interlock path 70 therein. For example, during operation and with additional reference to FIGS. 5 and 6, as the injection molding system 10 translates the second mold plate 16 and the housing 50 along a linear, vertical direction 62 away from the first mold plate 12, interaction of each curved spline element 34 with the surrounding first shot material 60 causes the shaft 22 to rotate to form the mechanical interlock path 70 having undercuts or corresponding channel geometries 72. Further translation of the shaft 22 causes further rotation of the set of helical spline elements 30 such that the helical spline elements 30 are positioned between a first rotational position within the first shot material 60 to a second rotational position external to the first shot material 60, as indicated in FIG. 5. Accordingly, the configuration of the mechanical interlock pin assembly 20 utilizes the opening motion of the first and second mold plates 12, 16 to mechanically cause rotation of the shaft 22 after injection and settling of the first shot material.

Figure 6:
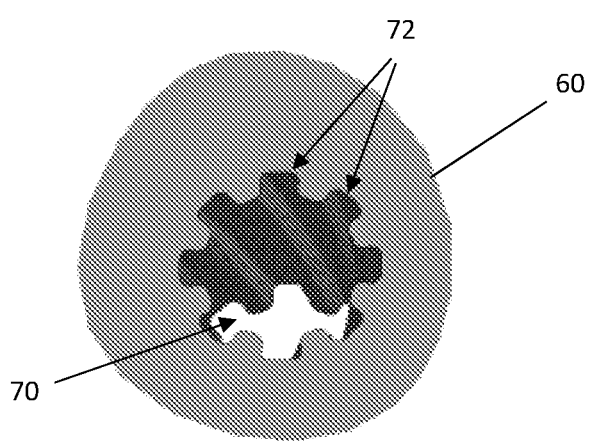
FIG. 6 illustrates a mechanical interlock path formed in a first shot material by the mechanical interlock pin assembly of FIG. 2, according to one arrangement.

As indicated in FIG. 6, in the case where the shaft face 42 of the set of helical spline elements 30 contacts the mold face 68 of the mold cavity 14 during injection, removal of the set of helical spline elements 30 from the first shot material 60 forms the mechanical interlock path 70 as a through hole through the material 60. As provided above, this process minimizes or prevents the creation of a blind pocket within the first shot material 60.

Figure 7:
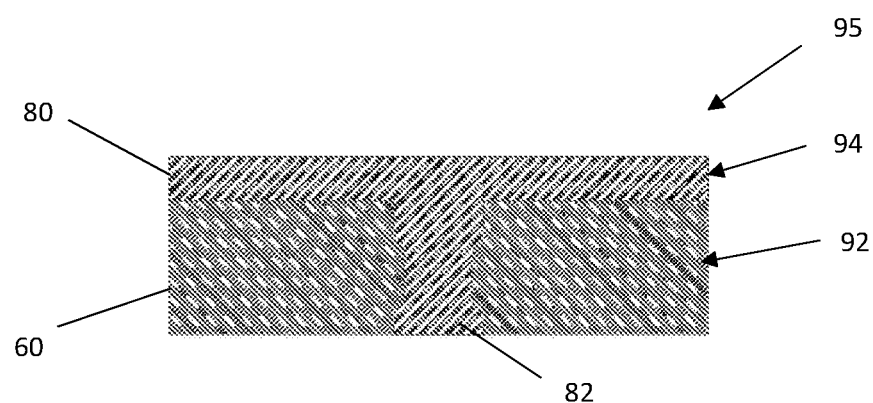
FIG. 7 illustrates a side sectional view of a first shot material formed using the mechanical interlock pin assembly of FIG. 2 and a corresponding second shot material, according to one arrangement.
Figure 8:
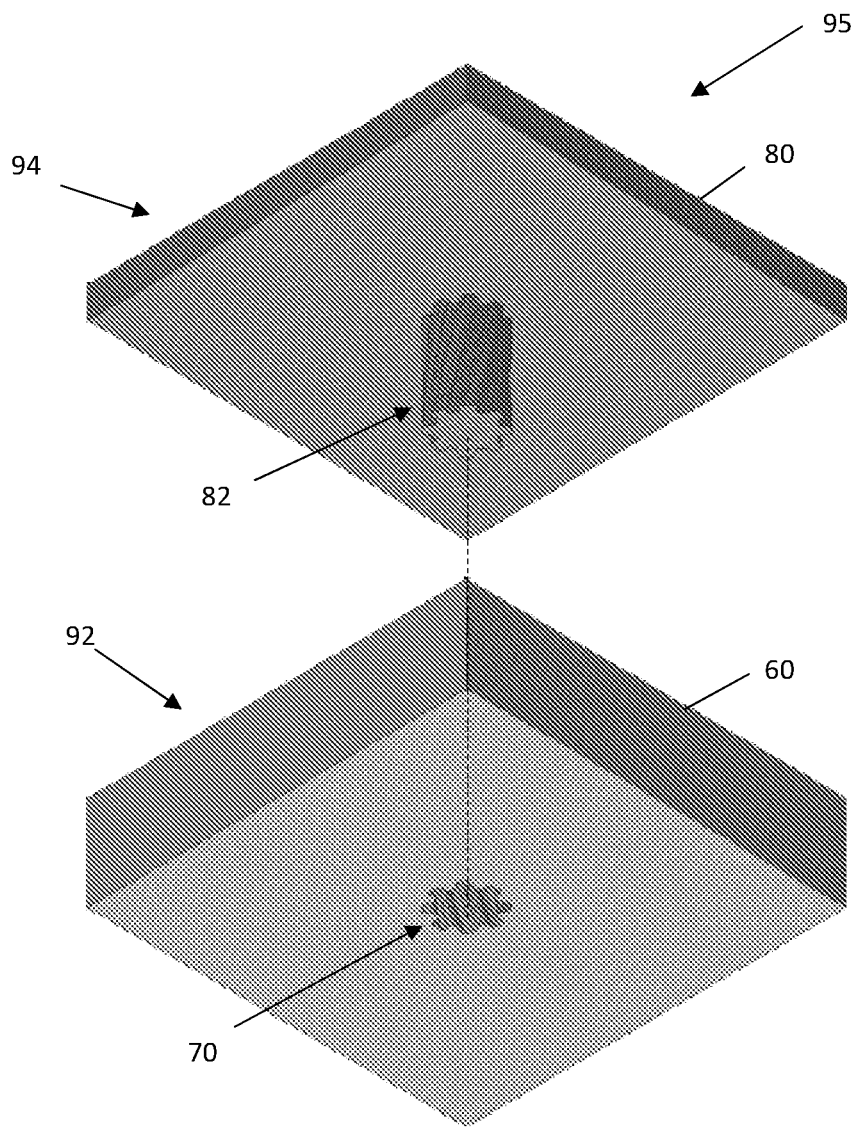
FIG. 8 illustrates an exploded view of the first shot material and corresponding second shot material of FIG. 7, according to one arrangement.

Next, the injection molding system 10 is configured to inject a second shot material 80 into the mold cavity 14. For example, after molding the first shot material 60 to form a first portion 92 of an injection molded element 95, the first mold plate 12 can be rotated to a third mold plate (not shown), closed against the third mold plate, and a second shot material 80, such as a liquid polymer material, injected into the mold cavity 14. The second shot material 80 flows into the mechanical interlock path 70 and contacts the corresponding channel geometries 72 formed in the first shot material 60, as shown in FIGS. 7 and 8. As the second shot material 80 cools and hardens, the resulting second portion 94 forms a splined mechanical interlock portion 82 with the first portion 92 of the injection molded element 95. Such interlocking of the splined elements of the portions 92, 94, along with the chemical bonding of the portions, limits the ability for the second portion 94 to loosen or become separated from the first portion 94.

Following cooling of the resulting molded element 95, the injection molding system 10 ejects the molded element 95 from the first mold plate 12 and the process repeated.

As described above, the mechanical interlock pin assembly 20 includes a shaft 22 having a set of helical spline elements 30 that extend along a longitudinal axis 32 of the shaft 22. Such description is by way of example only. It should be understood that the shaft 22 can include a set of any tortuous geometry elements, such as channels or protrusions, which extend about the distal end 26 of the shaft 22. These tortuous geometry elements are configured to create undercuts or a channel geometry of a mechanical interlock path in a first shot material during a two-shot molding process.

As described above, each spline element 34 of the set of helical spline elements 30 is configured as a protrusion that extends in a radial direction from the longitudinal axis 32 of the shaft 22. Such description is by way of example only. It should be understood that each spline element 34 of the set of helical spline elements 30 can be configured as a channel that extends in a radial direction toward the longitudinal axis 32 of the shaft 22. Further, it should be understood that the set of helical spline elements 30 can be configured as a combination of protrusions and channels.

While various embodiments of the innovation have been particularly shown and described, it will be understood by those skilled in the art that various changes in form and details may be made therein without departing from the spirit and scope of the innovation as defined by the appended claims.

What is claimed is:

1. A mechanical interlock pin assembly, comprising:
a shaft having a first end and a second end;
a set of helical spline elements disposed at the first end of the shaft and extending from a shoulder portion disposed at the first end of the shaft;
a bearing rotatably coupled to the second end of the shaft, the bearing configured to allow rotation of the shaft relative to a mold cavity;
wherein each spline element of the set of helical spline elements is disposed at a pitch of between about 2° and 30° relative to a longitudinal axis of the shaft.

2. The mechanical interlock pin assembly of claim 1, wherein the set of helical spine elements comprises between four and thirty helical spline elements.

3. The mechanical interlock pin assembly of claim 1, wherein the bearing comprises a bearing assembly, the bearing assembly comprising:
a housing; and
a bearing element carried by the housing, the bearing element configured to allow rotation of the shaft between the first rotational position and the second rotational position relative to the housing.

4. The mechanical interlock pin assembly of claim 1, wherein an outer diameter of the set of helical spline elements is less than or equal an outer diameter of the shoulder portion.

5. The mechanical interlock pin assembly of claim 1, wherein the set of helical spline elements disposed at the first end of the shaft define a shaft face, an orientation of the shaft face being substantially normal to the longitudinal axis of the shaft.

6. An injection molding system, comprising:
a first mold plate defining a mold cavity;
a second mold plate opposing the first mold plate; and
a mechanical interlock pin assembly coupled to the second mold plate, comprising:
a shaft having a first end and a second end,
a set of helical spline elements disposed at the first end of the shaft and extending from a shoulder portion disposed at the first end of the shaft;
a bearing rotatably coupled to the second end of the shaft, the bearing configured to allow rotation of the shaft relative to a mold cavity;
wherein each spline element of the set of helical spline elements is disposed at a pitch of between about 2° and 30° relative to a longitudinal axis of the shaft.

7. The injection molding system of claim 6, wherein the set of helical spine elements comprises between four and thirty helical spline elements.

8. The injection molding system of claim 6, wherein the bearing comprises a bearing assembly, the bearing assembly comprising:

a housing connected to the second mold plate; and a bearing element carried by the housing, the bearing element configured to allow rotation of the shaft between the first rotational position and the second rotational position relative to the housing.

9. The injection molding system of claim 6, wherein an outer diameter of the set of helical spline elements is less than or equal to an outer diameter of the shoulder portion.

10. The injection molding system of claim 6, wherein the set of helical spline elements disposed at the first end of the shaft define a shaft face, an orientation of the shaft face being substantially normal to the longitudinal axis of the shaft.

\* \* \* \* \*